United States Patent [19]

Jovick

[11] 3,985,393
[45] *Oct. 12, 1976

[54] WHEEL MOUNTING MEANS

[75] Inventor: Raymond John Jovick, Troy, Mich.

[73] Assignee: Rockwell International Corporation, Pittsburgh, Pa.

[ * ] Notice: The portion of the term of this patent subsequent to Mar. 16, 1993, has been disclaimed.

[22] Filed: Mar. 20, 1975

[21] Appl. No.: 560,369

Related U.S. Application Data

[63] Continuation-in-part of Ser. No. 518,653, Oct. 29, 1974, Pat. No. 3,944,864.

[52] U.S. Cl. ................................ 301/131; 310/168
[51] Int. Cl.² ........................................ B60B 35/00
[58] Field of Search ............ 310/168, 155, 67, 156, 310/90; 324/170; 301/131, 132, 6 W, 110, 105

[56] References Cited
UNITED STATES PATENTS

| | | | |
|---|---|---|---|
| 1,534,056 | 4/1925 | De Bellis | 301/131 X |
| 2,609,243 | 9/1952 | Ponnequin | 301/105 X |
| 3,102,758 | 9/1963 | Holmes, Jr. | 301/105 |
| 3,826,933 | 7/1974 | Anselmino | 310/168 |

*Primary Examiner*—Donovan F. Duggan

[57] ABSTRACT

An improved wheel mounting means is provided for a wheel speed sensor which is capable of being mounted at the end of a spindle and includes wiring which passes through a central passageway in the spindle. The sensor is of a type to be employed with a toothed ring or rotor mounted in the hub cap for relative rotation between the sensor and the rotor to generate a signal indicative of wheel speed. The improvement to the sensor includes providing the sensor with a support structure which can be bolted to a keyed lock ring of the wheel mounting assembly and which encircles an extended portion of the spindle to provide the desired coaxial alignment of the sensor and rotor. A sealing member between the support structure and the extended portion of the spindle prevents wheel bearing lubricating fluid in the hub cap area from escaping through the passageway in the spindle. The improved wheel mounting means, with or without the sensor being installed, includes an adjusting nut on the spindle against the wheel bearing, a keyed lock ring to prevent rotation of the adjusting nut, and a jam nut to prevent removal of the keyed lock ring. A pair of bolt means threaded into the keyed lock ring fit in close alignment with the flat edges of the jam nut to prevent its accidental removal whether or not the bolt means are also used to mount the sensor.

3 Claims, 5 Drawing Figures

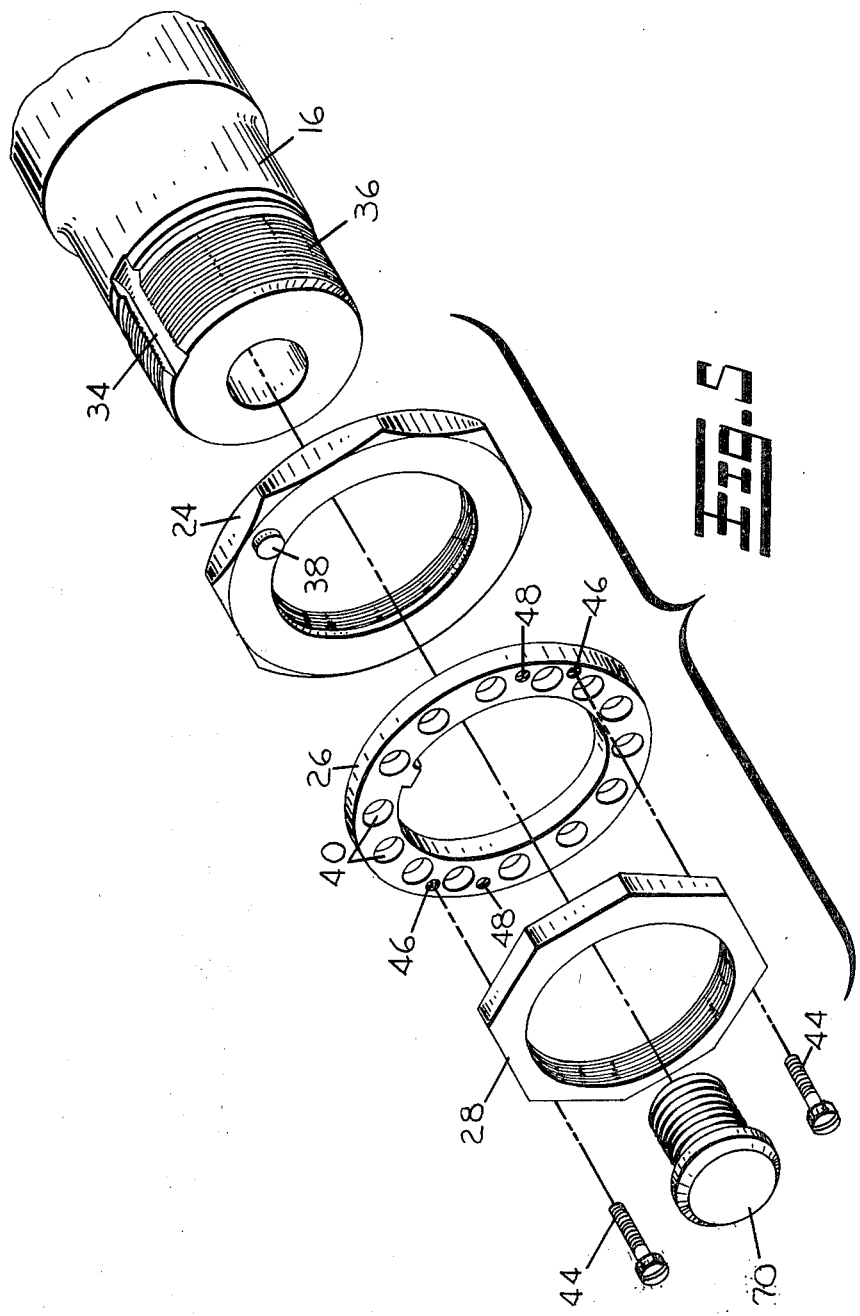

WHEEL MOUNTING MEANS

This is a continuation-in-part of application Ser. No. 518,653, filed Oct. 29, 1974, which matured into U.S. Pat. No. 3,944,864 on Mar. 16, 1976.

BACKGROUND OF THE INVENTION

1. Field of the Invention

This invention relates to an improved wheel mounting means and, more specifically, to such a wheel mounting means that can accommodate an improved wheel speed sensor for installation at the end of an axle spindle within the wheel hubcap area while properly securing the wheel on the spindle even if the sensor is not utilized.

2. Description of the Prior Art

It has been found desirable in the operation of an anti-skid braking system to provide an input representing the wheel speed. The wheel speed input is usually in the form of electrical signals indicative of the angular velocity of the wheel. These signals are generally derived from an electromagnetic sensor, including a magnet carried by a stationary portion of the trailer such as the axle spindle and a toothed or notched metal ring which rotates with the wheel relative the magnet. As the ring teeth pass the magnetic sensor, the resulting variations in flux produce a signal, the frequency of which is a function of the angular velocity of the wheel.

Because of the free-wheeling aspect of trailer wheels and the fixed mounting of the trailer axles upon which they are rotatably mounted, most trailer wheel speed sensors heretofore provided have been rigidly mounted within the open end of the spindle of the axle so that the sensor connecting wire can extend axially within the hollow interior of the axle. The wire exits the interior of the axle at an intermediate region remote from the wheel to be connected to the anti-skid braking system. Since the sensor extends from the end of the spindle, the notched ring is accordingly mounted within the hubcap rather than within the wheel housing so that only the hubcap need be removed to allow access to the sensor.

During installation of the wheel on the spindle, the hubcap is filled with lubricating fluid for the wheel bearing. It is obvious that with the hubcap speed sensor having a wire passing through an open end of the spindle, lubricating fluid would escape from the hubcap to the interior of the axle. Because of this problem, it has generally been the practice in the prior art to mount the speed sensor at and against the interior surface of the open end where sealing could be effectively provided. However, since the operating gap between the sensor and the ring must be a predetermined value on the order of about 0.030 inches and constantly maintained throughout wheel rotation, the configuration utilized in these prior art devices required the interior of the open end to be precision machined. Insuring the manufacturing tolerances of the spindle and hubcap are defined and maintained in this manner has been found to add significantly to the manufacturing cost of the spindle. Further, it has been the practice to precision machined openings with a predetermined inside diameter to match the particular sensor design employed. Accordingly, the spindle is then unable to accommodate other sensors of this general type which have different diameter dimensions.

Wheel speed sensors for braking control systems or the like are also utilized at the wheels of the steering axle but have generally been located within the brake area. U.S. Pat. Nos. 3,772,548 and 3,774,061 disclose sensors of this type which can be seen to require an annular-type rotor. A feature tending to complicate maintenance is the need to remove the entire wheel assembly to gain access to sensors of this type. Since the spindle of a steering axle does not include an open end and the overall diameter of the steering spindle is less than that of a spindle on the fixed axle, there appears to have been no attempts made to mount the prior art hubcap sensor devices discussed hereinabove on a steering axle.

It is therefore of concern that a wide variety of wheel speed sensoring devices have been utilized which have increased the cost of manufacturing the axle assembly, which have lacked compatibility with other axle assemblies not specifically adapted for their use, and/or which have generally increased maintenance and inventory problems.

SUMMARY OF THE INVENTION

It is therefore an object of the present invention to provide a wheel speed sensor configuration which is adapted for mounting within a wheel hubcap on spindles of fixed and steering axle assemblies.

It is a further object to provide a wheel speed sensor of the type described which includes mounting and alignment means without significantly adding to the manufacturing cost of the axle.

It is another object to provide a wheel speed sensor of the type described wherein the mounting and alignment means is consistent with safe, reliable wheel operation.

It is still another object to provide a wheel speed sensor of the type described which facilitates sealing to prevent loss of wheel bearing lubricating fluid from the hubcap to the interior of the spindle which interior receives the connecting wiring from the sensor.

It is yet another object to provide a wheel mounting means for the wheel speed sensor that will prevent inadvertent removal of the wheel during operation and can be utilized for this purpose even if the sensor is not utilized.

To accomplish these and other objects of the invention, a preferred embodiment thereof includes an improved wheel mounting means capable of being utilized to mount a wheel speed sensor of the type mounted at the end of a spindle of an axle. The spindle including an interior passageway through which wiring from the sensor extends and means for retaining a wheel mounted thereon which includes a wheel bearing adjustment nut, a keyed lock ring, and a jam nut adapted to be respectively received on a threaded portion of the end of the spindle outwardly of the wheel. The sensor has included therein an electromagnetic sensing means for generating a signal indicative of wheel speed when aligned with a rotor means which is coaxially aligned with and mounted within a hubcap secured to the wheel for relative rotational movement between the sensor and the rotor means. The improvement includes means for securing the sensor to the keyed lock ring by bolt means which will prevent rotation and removal of the jam nut and may be employed for this purpose even if the wheel speed sensor is not utilized.

The sensor is also adapted to make contact with the end of the spindle for alignment with respect to the rotor means at a region thereof which is remote from the interior passageway. Contact between the sensor and the spindle is preferably provided at an extended portion of the spindle which is disposed in an axial direction outwardly of the threaded portion. The sensor is coaxially aligned with the rotor means and wheel bearing lubricating fluid is retained in the hubcap area as a support structure of the sensor encircles the extended portion and includes a sealing means therein.

BRIEF DESCRIPTION OF THE DRAWINGS

FIG. 5 is a view like that of FIG. 1 in which the sensor is omitted and the wheel mounting means alone may be utilized to secure a wheel on a spindle.

DETAILED DESCRIPTION OF THE PREFERRED EMBODIMENTS

Figure 1:
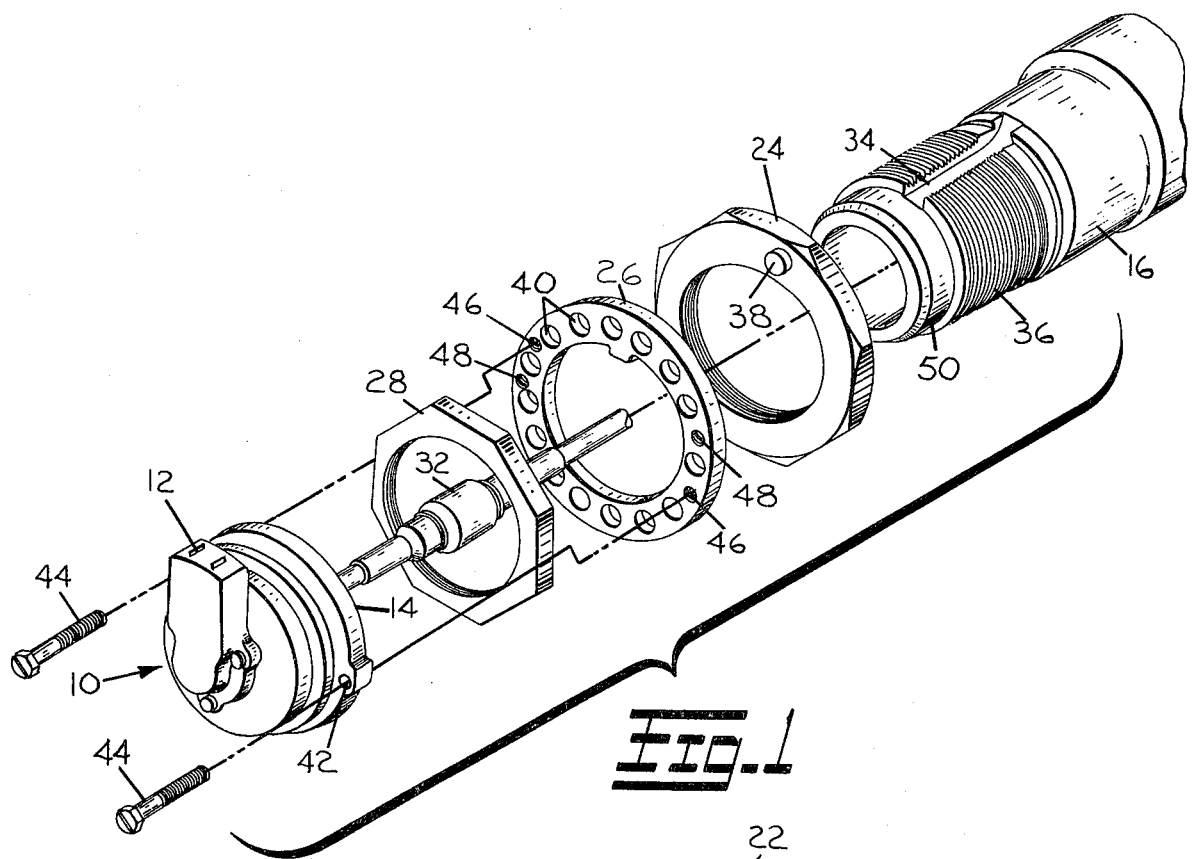
FIG. 1 is a perspective, preassembled view of the preferred wheel speed sensor including various features of the invention.

As shown in FIG. 1, a wheel speed sensor 10 of the present invention includes an electromagnetic sensing device 12 mounted therein and a support structure 14 by which it is mounted in a fixed relationship to the spindle 16 of a vehicle axle.

Figure 3:
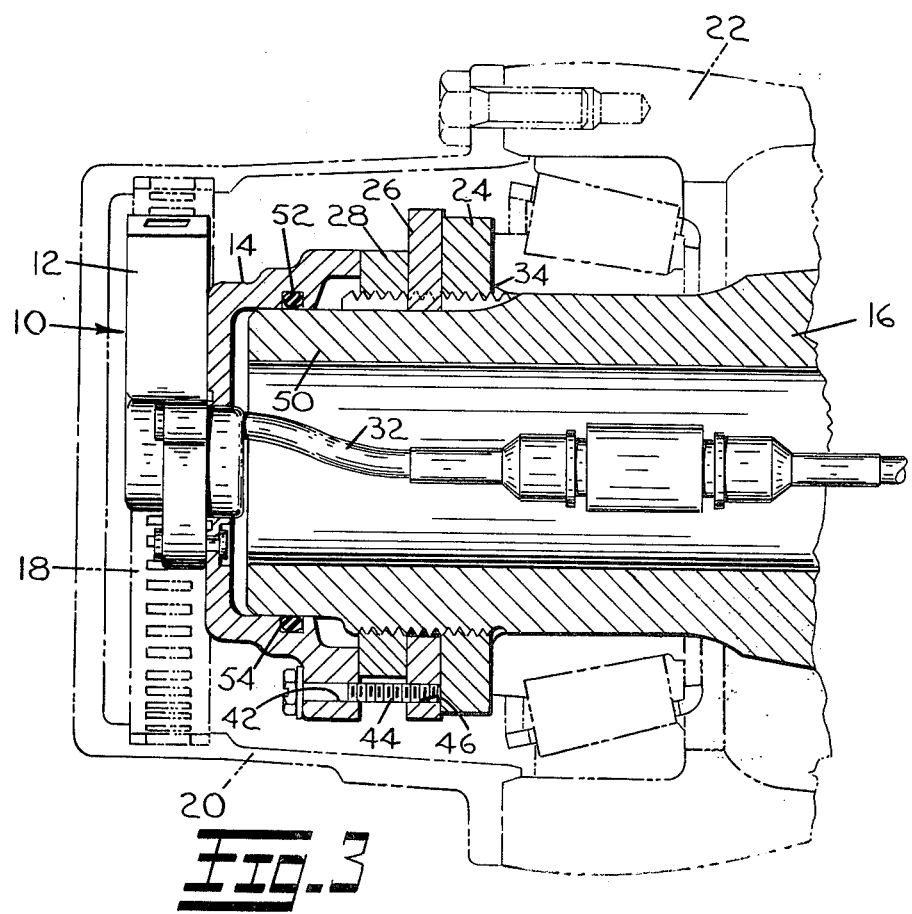
FIG. 3 is a view of the sensor as seen along line 3—3 of FIG. 2.

It can be seen in FIG. 3 that in normal use the sensing device 12 of the sensor 10 is aligned with a rotor 18 fixedly secured to the interior of a hubcap 20. Since the hubcap 20 is secured to the hub of wheel 22, relative rotation of the rotor 18 about the sensor 10 will generate a signal indicative of wheel speed which signal is utilized in a braking control system or the like (not shown).

In a typical installation of a wheel on a spindle, the hub of the wheel having included bearing members is positioned to closely encircle the end of a spindle. A wheel bearing adjusting nut is installed on the threaded end of the spindle and is followed by a lock ring which is keyed to a groove in the threaded end of the spindle to prevent its rotation. Finally, a jam nut is threaded on the end to retain the lock ring in position. The hubcap covers the mounting elements and retains lubricating fluid needed for effective wheel bearing operation.

In the installations shown in FIGS. 1, 2, 3 and 4 the preferred adjusting nut 24, keyed lock ring 26, jam nut 28 or 28' and hubcap 20 satisfy these and other functions which will be explained in detail herein. The spindles 16 and 30 shown respectively in FIGS. 1, 2 and 3 and FIG. 4 are each of the type found on a rigid axle member having a hollow interior. Although the hollow interior provides a convenient passageway for connecting wire 32 from the sensor 10 to the braking control system, it has required some form of sealing for all hubcap speed sensors of this general type to prevent the loss of wheel bearing lubricating fluid into the interior of the axle.

However, it should be apparent to one skilled in the axle and wheel mounting art that the general problems and requirements for a rigid axle would be equally applicable for a steering axle in which a hubcap type speed sensor is to be utilized for indicating wheel speed. It is expected that the disclosure provided herein will be sufficiently clear to enable one to utilize the mounting and sealing means of the present invention on the spindle of a steering axle even though it is recognized that a single embodiment for both may not be practical because of the general practice of making the outside diameter of the steering spindle smaller than that of the fixed axle. Although the connecting wires would have to exit the knuckle from which the spindle extends in such a manner that it will not interfere with the action of the knuckle around the steering king pin, there would still exist a similar mounting requirement and a related sealing problem if the connecting wiring extends centrally of the spindle. Accordingly, it will be clear to one skilled in the axle and wheel mounting art that the claims provided hereinbelow will be as applicable for a steering axle configuration as for the rigid axle configurations shown in the figures.

Figure 2:
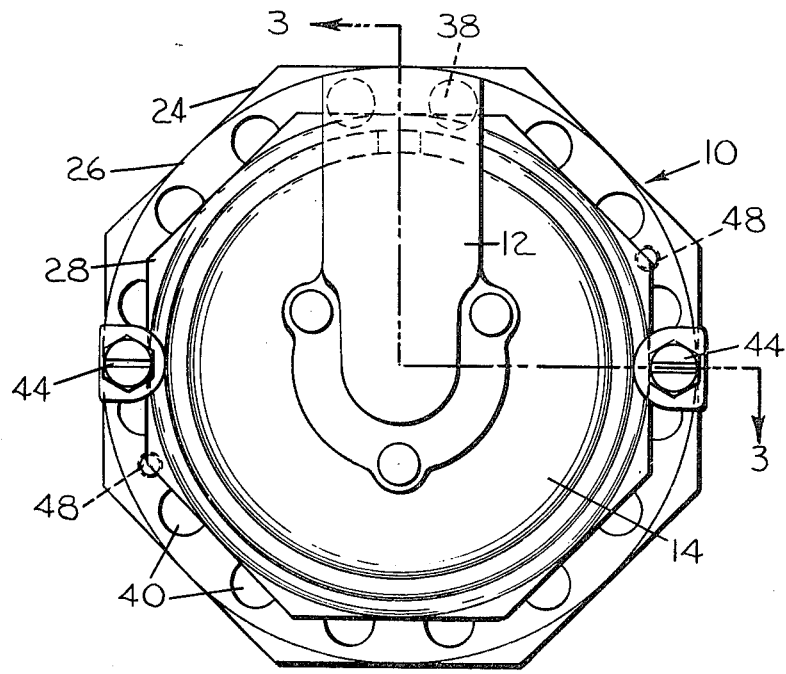
FIG. 2 is an end view of the sensor as mounted on the spindle.

Returning to the preferred eembodiment of FIGS. 1, 2 and 3, with the adjusting nut 24 installed against the bearing assembly of the wheel 22, the keyed lock ring 26 is positioned in a longitudinal groove 34 in the threaded surface 36 of spindle 10. An extension 38 on the outward surface of the nut 24 is adapted to be received within one of a plurality of holes 40 disposed around the ring 26 and will prevent undesirable rotation of the adjusting nut 24 when the keyed lock ring 26 is axially positioned against the nut 24. The jam nut 28 is installed for this purpose and is torqued in position to generally prevent it from being inadvertently unscrewed from the spindle 16.

With any effort to provide a means for securing a hubcap type wheel speed sensor to a spindle at a location other than the interior of the opened end of the spindle, the jam nut 28 being the outermost member would be first considered. It can be seen that securing the sensor to the jam nut 28 under ideal conditions would satisfy the general tolerance objectives. However, on further observation, if foreign matter were to enter the hubcap 20 or if the sensor were to be knocked out of alignment during wheel maintenance, mechanical contact between the rotor and sensor could result. This possibility is not that remote when one considers the small gap space between the sensor and rotor mentioned hereinabove. Binding between the sensor and the rotor would be transferred to the jam nut 28 and cause it to rotate relative the spindle. Unthreading the jam nut 28 might result in an uncontrolled and unexpected loss of the wheel.

Therefore, in the preferred configurations, the sensor 10 is secured to the keyed lock ring 26. For this purpose a pair of support holes 42 are provided at opposite edges of the support structure 14 to receive a pair of mounting bolts 44. The bolts 44 extend inwardly toward the lock ring 26 to be threaded into a pair of mounting holes 46 therein. Although tightening the bolts 44 brings the support structure 14 against the jam nut 28 tending to prevent it from unthreading, the bolts 44 and holes 42 and 46 are also spaced in close alignment with the flat edges of the jam nut 28 to further prevent its rotational movement after being torqued into position. Since the angular alignment of the jam nut 28 with respect to the keyed lock ring 26 cannot be accurately predicted, an alternative pair of mounting holes 48 are also provided in the lock ring 26 which are disposed angularly of the holes 46. For any jam nut setting either the holes 46 or 48 will be accessible for mounting the sensor 10.

This latter point explains why it would be impractical to rely on the jam nut for mounting even if mounting bolts were intended to extend through the jam nut and into the keyed lock ring. There would be no means of insuring alignment of the holes in each and an alternative such as a slotted opening in the keyed lock ring would not provide an adequate fixed relationship between the nut and ring. Violent sensor movement might sever the bolts and allow continued jam nut rotation as described above.

In the preferred installation as shown in FIG. 3, the spindle 16 has been provided an extended portion 50 which has an accurately machined outer periphery which is easily and inexpensively provided when other machining is performed. The interior of the support structure 14 closely encircles the extended portion 50 so that the extended portion 50 provides basic alignment for the sensor 10 with respect to the rotor and provides a surface against which sealing means can be positioned to prevent escape of lubricating fluid to within the axle. In the preferred sealing means, a groove 52 provided around the interior of the structure 14 is fitted with an O-ring sealing member 54 of rubber or other compressible material to prevent the lubricating fluid in the hubcap 20 for passing between the sensor 10 and extended portion 50 into the axle.

Figure 4:
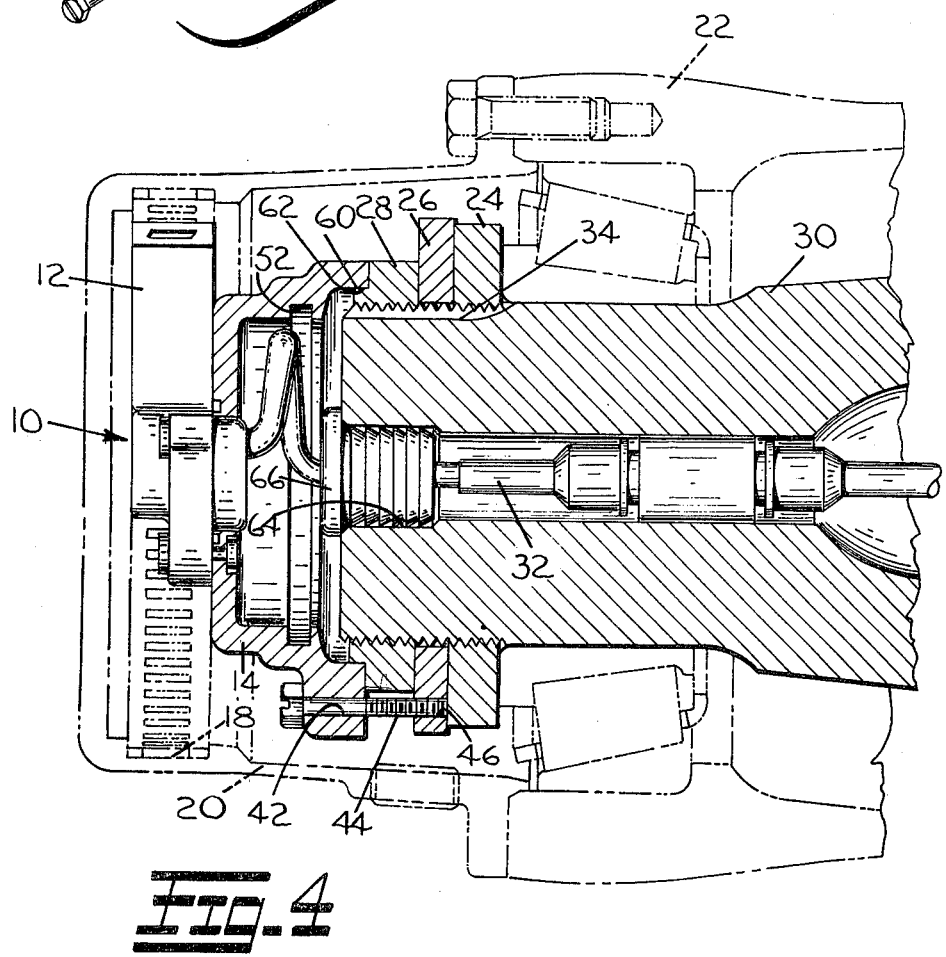
FIG. 4 is a view like that of FIG. 3 of an alternative means of mounting the sensor.

In the preferred configuration of FIGS. 1, 2 and 3, the extended portion 50 facilitates proper alignment and sealing for the sensor 10 which demonstrates the practicality of a sensor which is mounted to the spindle at a location other than at the central opening in its end. However, there may be a number of axles presently in service which have spindles, such as spindle 30 shown in FIG. 4, which have no extended portion and for which one could not be practically provided. For this reason, the configuration shown in FIG. 4 shows how the mounting means of the present invention could be utilized on a spindle 30. The same sensor 10 can be employed and would doing so tend to simplify inventory and maintenance problems by being applicable for any spindle having the same outside diameter.

To provide coaxial alignment for the sensor 10 for relative positioning with respect to the rotor 18, an alternative jam nut 28' includes a precisely located shoulder 60. An interior edge 62 of the sensor 10 closely mates with the shoulder 60 to position the sensor 10 independently of the size, shape or axial positioning of the end opening 64 of the spindle 30. To provide sealing, a rubber bushing 66 encircles the connecting wire 32 and is tightly received within the end opening 64. Since the present invention, unlike some wheel speed sensors of the prior art, does not rely upon making contact at the end opening 64 for alignment or for preventing relative rotation of the sensor with respect to the spindle, the design and tolerances of the bushing 66 are greatly simplified. Further, there are presently known to exist end openings 64 which are machined to different sizes to accommodate different sensors found in the prior art or which are not machined to any particular size because no wheel speed sensor is presently being used. Providing bushings 66 of different sizes would satisfy the particular sealing requirement for any spindle 30 so that the same sensor 10 could be utilized independently of the particular end opening 64.

It can also be seen from the description provided hereinabove that while providing a mounting means for the preferred sensor, an improved wheel mounting means has also been provided. The improved wheel mounting means is shown in FIG. 5 and can be seen to provide a safe, effective way of mounting the wheel (not shown) on the spindle 16 even if a sensor is not utilized. Although the preferred keyed lock ring 26 accommodates the sensor, installation of the bolts 44 in the appropriate holes 46 or 48 without first including the sensor prevents the jam nut 28 from unthreading. Accordingly, the improved wheel mounting means of the present invention may insure reliable wheel operation while still being capable of accommodating a wheel speed sensor if later desired. If the improved wheel mounting means is utilized on a fixed or steering axle having a hollow spindle 30, a plug 70 may be employed to prevent loss of lubricating fluid as described hereinabove. If the axle is solid, the plug 70 would not be required. It is also apparent that if the use of the sensor is not immediately contemplated, the use of only one bolt 44 or a modified version thereof could be provided while still being within the scope of the invention as claimed.

While there has been shown and described herein a preferred embodiment of the invention, it will be obvious to those skilled in the art that changes and modifications may be made therein without departing from the invention as claimed.

What is claimed is:

1. An improved wheel mounting means of the type which is utilized to secure a wheel on a spindle of an axle, said spindle having a threaded portion outwardly of said wheel mounted thereon and a longitudinal groove axially disposed at the surface of said threaded portion, wherein said improvement comprises:
   an adjusting nut threaded onto said threaded portion to make contact with a bearing portion of said wheel;
   a keyed lock ring capable of encircling said threaded portion when an inwardly extended key thereof is received within said longitudinal groove, said keyed lock ring being axially positioned against said adjusting nut with said key preventing said keyed lock ring from rotating about said threaded portion;
   a jam nut threaded onto said threaded portion against said keyed lock ring, said jam nut having at least one flat working surface at its outer periphery; and
   at least one bolt means threaded into an axially disposed hole in said keyed lock ring and extending outwardly thereof adjacent said flat working surface of said jam nut to prevent rotation of said jam nut as would be required for its removal from said threaded portion of said spindle.

2. An improved wheel mounting means as set forth in claim 1, wherein said jam nut includes a plurality of said flat working surfaces equally spaced about said periphery and equally spaced from a center of said jam nut, said keyed lock ring has a first pair of said holes aligned with two of said plurality of said flat working surfaces to receive a pair of said bolt means, and said keyed lock ring has at least a second pair of said holes which are capable of receiving said pair of said bolt means at a pair of said plurality of said flat working surfaces when the relative angular position of said jam nut with respect to said keyed lock ring prevents access by said pair of said bolt means to said first pair of said holes.

3. An improved wheel mounting means as set forth in claim 2, wherein said adjusting nut includes on a surface thereof toward said keyed lock ring an outwardly extended tab and said keyed lock ring includes an array of openings therethrough each of which is adapted to receive said tab and one of which receives said tab when said keyed lock ring is installed on said spindle so that said adjusting nut is prevented from rotating about said threaded surface by said tab being received within said one of said openings of said array.

* * * * *